US00RE38497E

(19) United States
(12) Reissued Patent
Falk et al.

(10) Patent Number: US RE38,497 E
(45) Date of Reissued Patent: Apr. 20, 2004

(54) VEST INCLUDING A RETRACTOR POCKET AND RETRACTOR THEREIN; AND METHOD OF MANUFACTURING VEST

(75) Inventors: Heather D. Falk, Bozeman, MT (US); Kenneth C. Walsh, Bozeman, MT (US)

(73) Assignee: Simms Fishing Products Corporation, Bozeman, MT (US)

(21) Appl. No.: 09/824,482

(22) Filed: Oct. 27, 2000

Related U.S. Patent Documents

Reissue of:
(64) Patent No.: 5,829,060
Issued: Nov. 3, 1998
Appl. No.: 08/920,381
Filed: Aug. 29, 1997

(51) Int. Cl.[7] ..... A41D 1/04

(52) U.S. Cl. ..... 2/102; 94/247

(58) Field of Search ..... 2/102, 108, 69, 2/79, 106, 105, 115, 94, 85, 93, 159, 160, 247, 249, 250, 253, 237, 341, 80, 227, 228, 238; 224/208, 232, 209, 249, 210, 230, 211, 255, 215, 680–684, 216, 914, 920, 615–623; 24/3.5, 3.13, 300, 301

(56) References Cited

U.S. PATENT DOCUMENTS

| | | | |
|---|---|---|---|
| 1,131,054 | A | 3/1915 | Glassman |
| 1,879,341 | A | 9/1932 | Lapham |
| 2,717,391 | A | 9/1955 | Bracken |
| 3,130,416 | A | 4/1964 | Mitchell et al. |
| 4,106,121 | A | 8/1978 | Belson |
| 4,334,326 | A | 6/1982 | Mallow |
| 4,791,681 | A | 12/1988 | Dean |
| 5,014,359 | A | 5/1991 | Hanson |
| 5,247,707 | A | 9/1993 | Parker et al. |
| 5,421,032 | A | 6/1995 | Murphy |
| 5,440,761 | A | 8/1995 | Abrams et al. |
| 5,526,535 | A | 6/1996 | Dobrzenski |
| 5,617,582 | A | 4/1997 | Burwell |

*Primary Examiner*—Gloria M. Hale
(74) *Attorney, Agent, or Firm*—Merchant & Gould P.C.

(57) ABSTRACT

A fishing vest including a retractor pocket which is inverted so that it opens downwardly when the vest is worn is provided by the invention. In a preferred embodiment, the fishing vest includes two retractor pockets. A first retractor pocket is provided between the upper left breast pocket and the neckline, and a second retractor pocket is provided between the upper right breast pocket and the neckline. Each retractor pocket includes a retractor provided within the interior thereof.

31 Claims, 5 Drawing Sheets

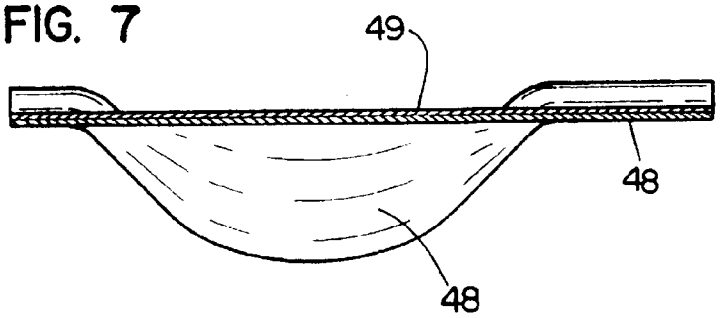
FIG. 7
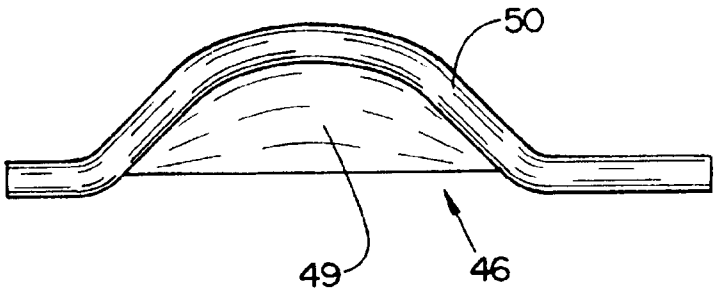
FIG. 6
FIG. 8
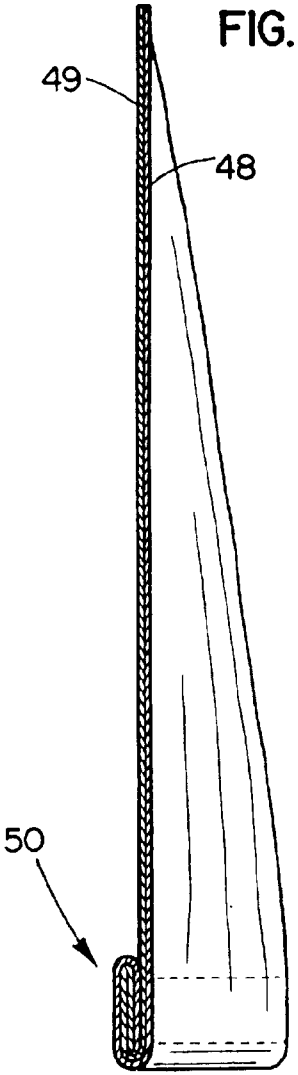

VEST INCLUDING A RETRACTOR POCKET AND RETRACTOR THEREIN; AND METHOD OF MANUFACTURING VEST

Matter enclosed in heavy brackets [ ] appears in the original patent but forms no part of this reissue specification; matter printed in italics indicates the additions made by reissue.

FIELD OF THE INVENTION

The present invention relates to a vest including a retractor pocket, and to a method for manufacturing a vest including a retractor pocket. More particularly, the invention relates to a fishing vest provided with a retractor pocket which is inverted so that it opens downwardly when the vest is worn, and includes a retractor provided therein.

BACKGROUND OF THE INVENTION

Fishing vests have been used by fishermen for many years. Generally, fishing vests include pockets for storing fishing accessories while fishing. Exemplary pieces of equipment often used by fishermen include, for example, flies, lures, fishing line, insect repellent, matches, nippers, calipers, jackets, gloves, and the like. A fishing vest is a convenient article of clothing which allows fishermen to carry such equipment with them and use it when needed. Several United States Patents which describe fishing vests include U.S. Pat. No. 1,879,341 to Lapham, U.S. Pat. No. 5,247,707 to Parker et al., U.S. Pat. No. 5,014,359 to Hanson, U.S. Pat. No. to 2,717,391 to Bracken, and U.S. Pat. No. 5,526,535 to Dobrzenski. Several catalogs showing commercially available fishing vests are available from Simms® Fishing Products, Inc. of Bozeman. Mont., and L. L. Bean® of Freeport, Me. A common feature of the fishing vests described in these publications is that they include several pockets for holding fishing accessories.

Certain types of fishing equipment are used frequently by fishermen, and it is desirable to have such equipment easily assessable when their use is required. Exemplary types of frequently used equipment include a hemostat, a clipper, fly dressing, and the like. Rather than storing this type of equipment in pockets, it has been found to be advantageous to attach it to fishing vests using a retractor. In addition, certain types of equipment are easily dropped. When wading in a river, this may result in loss of the equipment. Accordingly, many fishermen use retractors to attach such equipment to a fishing vest to prevent loss. Many forms of retractors are commercially available. Commercially available retractors can be obtained from Simms® Fishing Products, Inc. These retractors are generally of the type having a spring provided within a rigid housing and with a clip on one end of the spring and which can be pulled out from inside the housing. The housing is attachable to a fishing vest. Fishing equipment can then be attached to the clip. Another style of commercially available retractor is sold under the name Zinge.®

SUMMARY OF THE INVENTION

A vest for holding fishing accessories is provided by the present invention. The vest includes a shell structure having a neckline, a left arm hole, a right arm hole, and a bottom edge. The shell is constructed and arranged to fit over a human chest. The vest includes a plurality of pockets for storing fishing accessories attached to the shell structure. At least one of the plurality of pockets is a retractor pocket provided with an interior region and an opening facing downwardly when the vest is worn by a wearer in an upright standing position. A retractor is secured within the interior of the retractor pocket. Preferably, the retractor is a spring-type retractor formed from a polyurethane material.

A method for manufacturing a vest including a retractor pocket is provided by the present invention. The method includes a step of providing a shell structure having a neckline, a left arm hole, a right arm hole, and a bottom edge, and wherein the shell structure is constructed and arranged to fit over a human chest. The method includes a step of providing a sheath over a portion of the shell structure to provide a pocket which has an opening facing downwardly when the vest is worn by a wearer in an upright standing position. The sheath is secured to the shell, preferably by stitching. The method additionally includes a step of providing a retractor within an interior region of the retractor pocket.

BRIEF DESCRIPTION OF THE DRAWINGS

The following is a brief description of the drawings showing various features of the present invention.

FIG. 6 is an enlarged bottom view of the left breast retractor pocket shown in FIG. 1;

FIG. 7 is an enlarged top view of the left breast retractor pocket shown in FIG. 1;

FIG. 8 is an enlarged side view of the left breast retractor pocket shown in FIG. 1.

DETAILED DESCRIPTION OF THE PREFERRED EMBODIMENT

Figure 1:
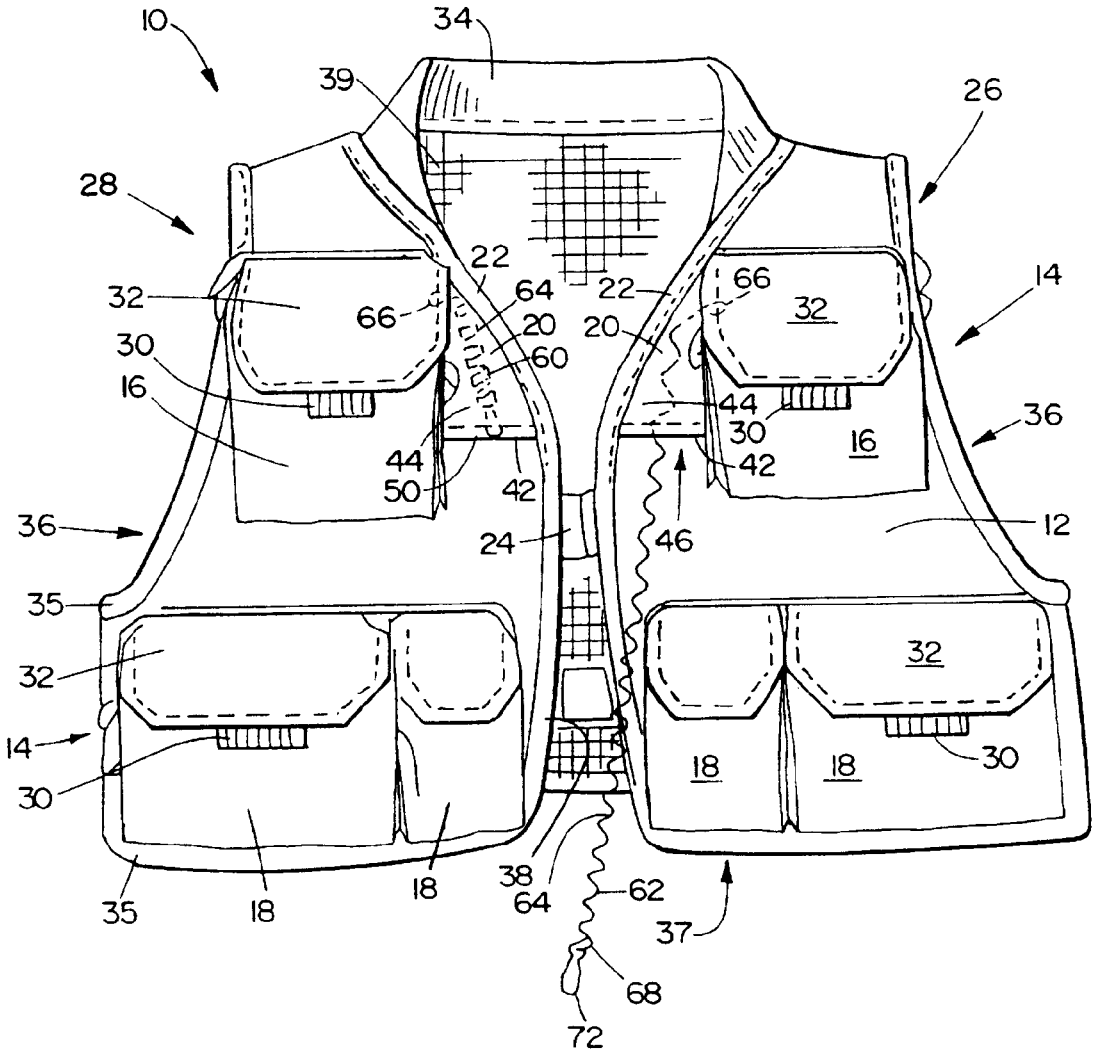
FIG. 1 is a front view of a fishing vest according to the principles of the present invention.
Figure 2:
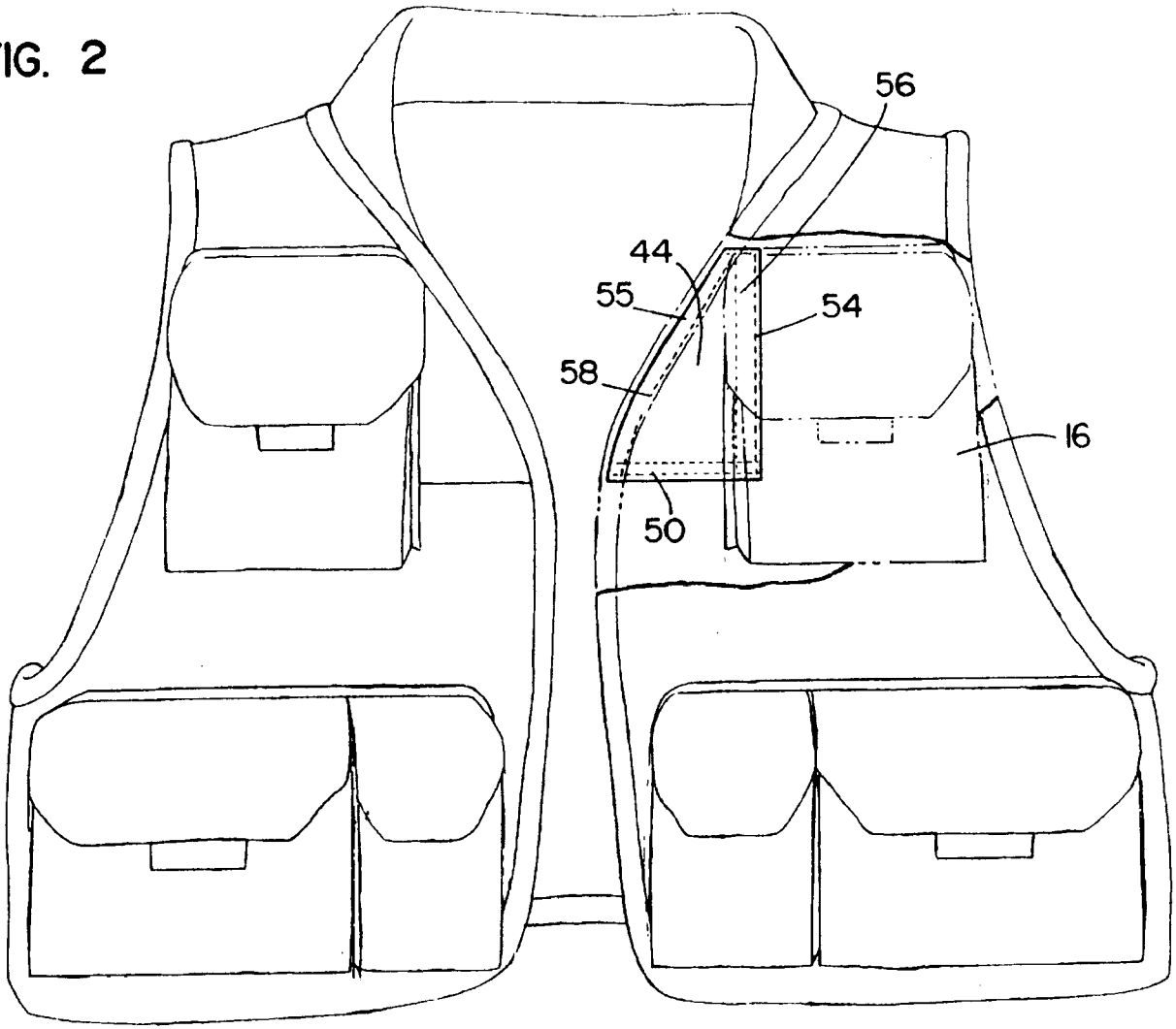
FIG. 2 is a cut away view of the fishing vest of FIG. 1 showing the attachment of the left breast retractor pocket.

Referring to FIG. 1, a fishing vest according to the principles of the present invention is depicted at reference numeral 10. A fishing vest is generally an article of clothing which when worn provides areas and/or pockets for storing accessories near the chest of the wearer. The fishing vest 10 includes a shell 12 which generally forms the exterior body of the vest, and accessory pockets 14 for holding fishing-related accessories. The fishing vest 10 generally fits around the chest of a wearer. That is, part of the vest extends over the shoulders and around the neck, and part of the vest extends around the back of a wearer and across the chest. The accessory pockets 14 include the upper pockets 16, the bottom pockets 18, and the retractor pockets 20. The accessory pockets 14 are sewn to the shell 12. The retractor pockets 20 are provided between the upper pockets 16 and the neckline 22. It should be appreciated that fishing vest 10 looks symmetrical with respect to the front of the vest. While symmetry is not a requirement of the invention, the following description of the invention is provided on the basis that the left breast retractor pocket and the right breast retractor pocket are manufactured in the same way from the same materials.

The fishing vest 10 of FIG. 1 additionally includes a buckle 24 for holding the left breast side 26 and the right breast side 28 of the vest 10 together around the chest of the wearer. Tabs 30 are provided on the pocket flaps 32 in order to allow easy opening of the pockets to access the interior thereof. The collar 34 is provided around the neck line 22, and a binding 35 finishes the edge along the arm holes 36, the bottom edge 37, and the front center edge 38. The inner lining 39 is shown as the interior surface of the vest. Although not shown, the fishing vest additionally includes rear pockets provided on the back side of the vest.

The retractor pockets 20 are provided in an inverted position. This means that the pocket opening 42 faces or opens downwardly when the vest is worn by a person standing in an upright position. In other words, the pocket is provided in a configuration which would cause items placed loosely therein to fall out under the force of gravity when the vest is worn by a person standing in an upright position. According to the present invention, items are attached inside the retractor pockets 20 so they do not fall out when the vest is worn by a person standing in an upright position. The retractor pockets 20 are generally provided with an upside down cup-like appearance.

Now referring to FIGS. 1, 2, and 5–8, the construction of the left breast retractor pocket 20 is shown in detail. It should be understood that the right breast retractor pocket is preferably formed in the same way. The retractor pocket 20 is formed from a sheath or cover 44 which is attached to the shell 12 to form an interior area 46 having an opening 42 which faces or opens downwardly when the fishing vest is worn by a person in a person in an upright position. Thus, items provided within the inverted retractor pockets 20 would normally fall out of the pockets unless they were anchored inside of the inverted retractor pockets. The sheath 44 is preferably provided as a combination of shell material 48 and interfacing 49 and provided in the pattern shown in FIG. 2. Furthermore, the bottom edge 50 of the sheath 44 is hemmed to provide a finished appearance. The sheath 44 is laid over the shell 12 at the appropriate location and provided with an amount of ease sufficient to provide the cup-like appearance shown in FIGS. 6 and 7. That is, the bottom edge 50 is not laid flat against the shell 12 but is provided with excess length so that a pocket is formed. The exterior edge 53 of the sheath 44 is stay-stitched to the shell 12 along stitch line 54. The upper pocket 16 is then sewn to the shell along stitch line 56. The interior edge 55 of the sheath 44 is attached to the shell 12 by the stitch line 58 provided by the binding 35.

Figure 9:
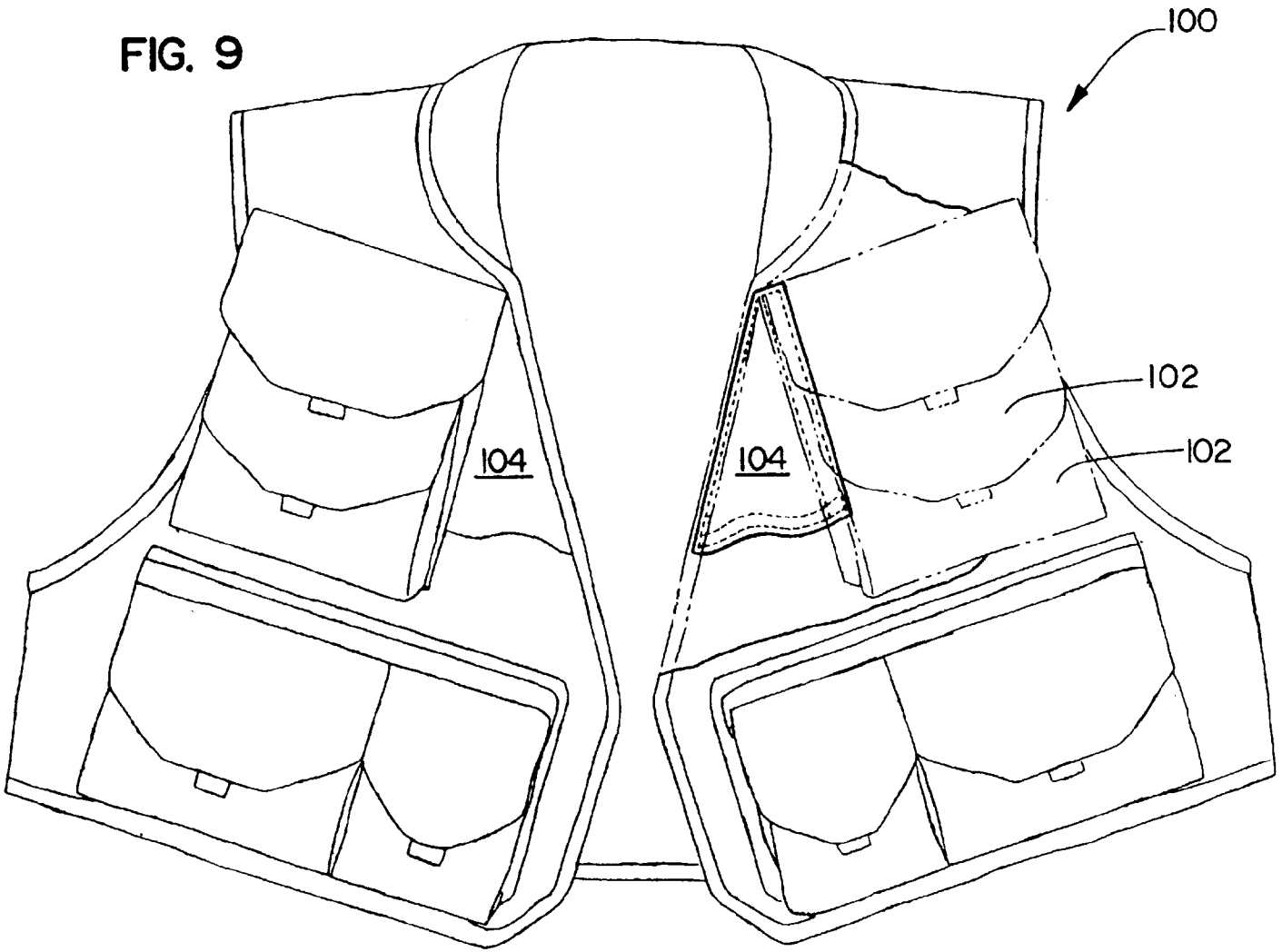
FIG. 9 is an alternative embodiment of a fishing vest having a retractor pocket according to the principle of the present invention.

It should be appreciated that various designs of fishing vests can be provided. For example, certain designs may have pockets located at different positions or provided with different shapes. An exemplary alternative design is provided by FIG. 9 where a vest 100 is shown having accessory pockets 102 and retractor pockets 104. It should be appreciated that while the preferred embodiment of the invention is described in relation to the use of a retractor pocket on a fishing vest, it should be appreciated that the retractor pocket can be applied to various other articles of clothing. For example, the inverted pocket of the invention can be provided on shirts, coats, hunting or utility vests, day packs, shorts, pants, and the like.

In the preferred embodiment of the invention, the retractor pockets are provided on the front portion of the vest. The reason for this is that they are much more accessible to a fisherman when they are provided at this location compared with, for example, being provided on the backside of the vest. Prior to this invention, the space provided between the upper pocket 16 and the neckline 22 has been left relatively unused. Thus, the present invention places the retractor pockets 20 at the location shown in FIG. 1 in order to take advantage of generally unused space.

Figure 3:
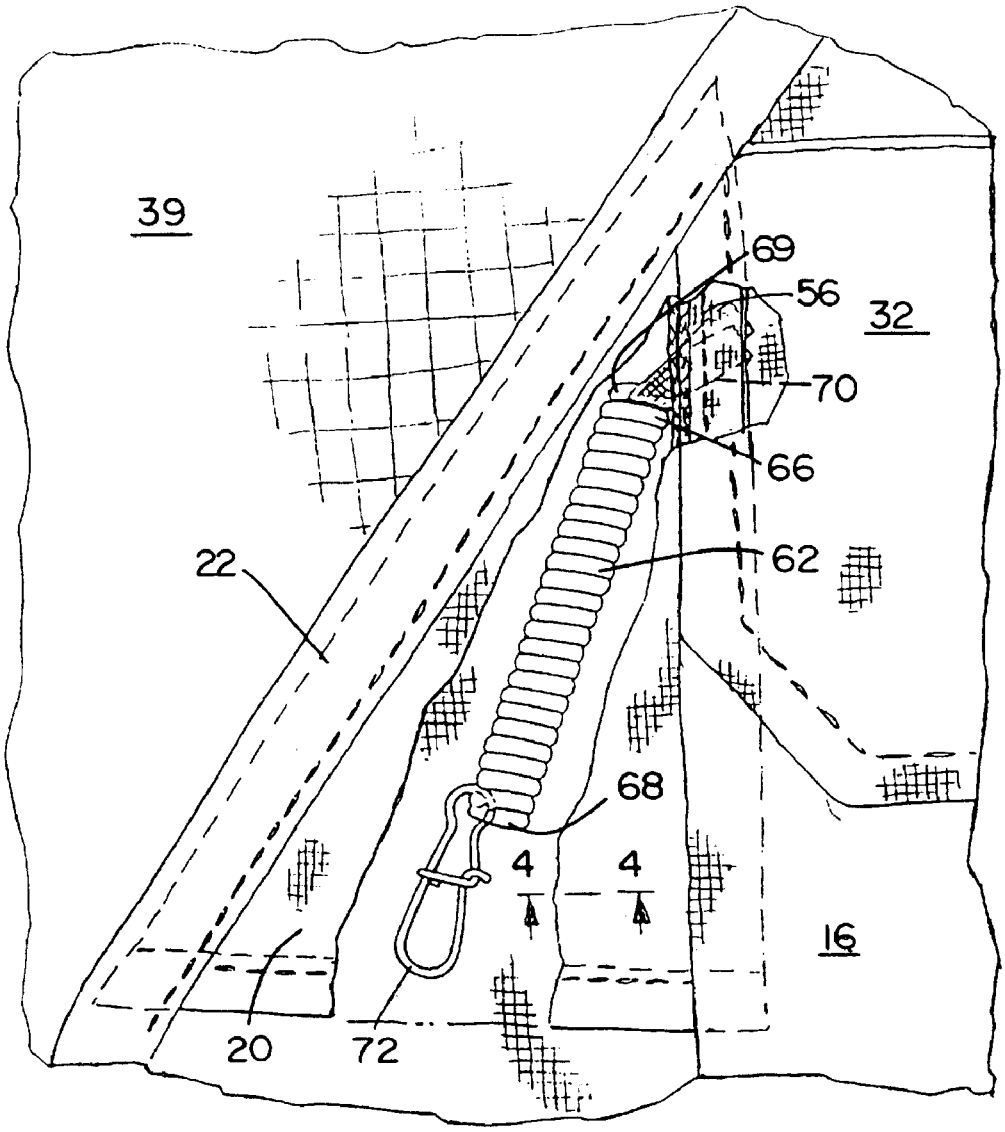
FIG. 3 is a partial cut-away view of the retractor pocket shown in FIG. 1 where the retractor is fastened by an alternative arrangement.
Figure 5:
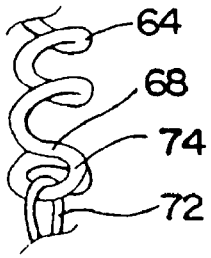
FIG. 5 is a partial view of the retractor shown in FIG. 1.
Figure 4:
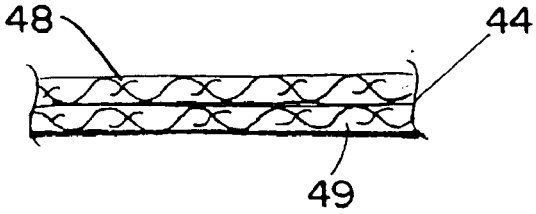
FIG. 4 is a sectional view of the sheath of the retractor pocket shown in FIG. 3.

Again referring to FIGS. 1 and 5, provided within the retractor pockets 20 are retractors 60 and 62. Retractor 60 is shown in the retracted or relaxed position, and retractor 62 is shown in the extended position. Both retractors 60 and 62 are spring type retractors based upon the design presently available from Simms® Fishing Products, Inc. of Bozeman Mont. in the Simms® Fishing Products 1977 catalog. The retractors 60 and 62 have been modified from the commercially available retractors to exclude the rigid housing because it is not needed. It should be appreciated, however, that the housing could be incorporated into the present invention without departing from the spirit of the invention. As shown in FIG. 1, the retractor 60 and 62 include a spring 64 which is expandable and biases to a retracted position. The spring 64 has a first end 66 and a second end 68. The first end 66 is stitched under the stay stitch line 54 and the pocket stitch line 56. An alternative preferred method for attaching the retractor 62 is shown in FIG. 3. The first end 66 is heat sealed to provide a loop 69 through which a ribbon 70 is provided. The ribbon 70 is then sewn to the vest by stay stitch line 54 and pocket stitch line 56. Attaching the retractor using a ribbon is preferred because it avoids potential problems created by stitching over the spring, and avoids the possibility that the spring might slide out of the stitching during later use of the vest. The ribbon can be provided for attachment of the retractor to the fishing vest. The ribbon ends are tacked in place over a drill hole on the front of the vest, located under the center front top portion of the chest pockets. A drawback to stitching the retractor directly to the vest is that there may be a risk in puncturing the retractor, or that the retractor may slip out of the stitch in some time during the useful life of the vest.

In a preferred embodiment, the ribbon 70 is secured three times. That is, by tacking the ribbon 70, by attachment of the sheath 44, and by attaching the upper pockets 16. It is believed that this amount of stitching should be sufficient to keep the retractor secured in place. It should be understood, however, that retractor can be held in place by other methods, such as, using adhesives or a different type of mechanical fastener.

The retractors 60 and 62 are provided with a clip 72 attached to the second end 68. As shown in greater detail in FIG. 3, the second end 68 includes a heat sealed loop 74, and the clip 72 fastens to the heat sealed loop 74. In the case, where the spring is prepared from a polyurethane material, the ends of the spring can be melted so that they fuse to a preceding coil on the spring. This allows the formation of a loop which provides for the attachment of the clip and the ribbon. The clip can then be utilized to hold various accessories such as nippers and clippers.

An advantage of the inverted retractor pockets is that the sheath 44 holds the retractor and accessory attached thereto closer to the chest of the wearer. This is particularly important when the wearer bends over. Prior retractor tend to simply fall away from the wearer's chest when the wearer bends over. This dangling of retractor and accessory away from the wearer's chest creates problems and can cause frustration when they become entangled with, for example, a fishing line. The retractor pocket of the present invention keeps the retractor and accessory held closely to the body in order to avoid this problem.

In a preferred embodiment of the fishing vest of the present invention, the shell and sheath are manufactured from Supplex® nylon which is available from Dupont, and provided with a Teflon® finish to provide water repellency. The interfacing is preferably a conventional support or stiffening material. It should be understood that any of various commonly known and used materials can be utilized in the present invention. Furthermore, in a preferred embodiment to the invention the pockets on the front of the vest are tilted at an angle so that the wearer can easily see inside the pockets when they are opened. In order to provide a low profile for the pockets, it is preferred that the pockets are pleated so that they tend to lay flat against the shell.

Although the invention has been shown and described with respect to certain preferred embodiments, certain variations and modifications may occur to those skilled in the art, and such variations and modifications should be considered within the scope of the invention.

We claim:

1. A vest for holding fishing accessories, said vest comprising:

(a) a shell structure having a neckline, a left arm hole, a right arm hole, and a bottom edge, the shell structure being considered and arranged to fit over a human chest;

(b) a plurality of pockets for storing fishing accessories attached to said shell structure, wherein at least one of said plurality of pockets is a retractor pocket provided with an interior region and an opening facing downwardly when the vest is worn by a wearer in an upright standing position; and (c) a retractor secured within the interior region of said retractor pocket.

2. A vest according to claim 1, wherein said retractor includes a spring formed from a polyurethane material.

3. A vest according to claim 1, comprising at least two retractor pockets for storing fishing accessories attached to said shell structure, wherein the at least two retractor pockets are provided with an interior region and an opening facing downwardly when the vest is worn by a wearer in an upright standing position.

4. A vest according to claim 3, wherein at least two retractor pockets are located on a front portion of the vest.

5. A vest according to claim 4, wherein at least two retractor pockets are provided adjacent the neckline.

6. A method for manufacturing a vest including a retractor pocket, said method comprising:

(a) providing a shell structure having a neckline, a left arm hole, a right arm hole and a bottom edge, the shell structure being constructed and arranged to fit over a human chest;

(b) providing a sheath over a portion of the shell structure to provide a pocket, wherein the pocket includes an opening which faces downwardly when the vest is worn by a wearer in an upright standing position; and (c) securing that sheath to the shell.

7. A method for manufacturing a vest including a retractor pocket according to claim 6, wherein the method includes a step of:

(a) providing a retractor within an interior region of the retractor pocket.

8. A method for manufacturing a vest including a retractor pocket according to claim 7, wherein the retractor includes a spring.

9. A method for manufacturing a vest including a retractor pocket according to claim 7, wherein the step of providing a retractor within an interior region of the retractor pocket includes stitching the retractor to the shell.

10. A method for manufacturing a vest including a retractor pocket according to claim 1. Further comprising placing the sheath adjacent the neckline.

*11. An article of clothing for holding fishing accessories, said article of clothing comprising:*

*(a) a shell structure having a neckline, a left arm hole, a right arm hole, and a bottom edge, the shell structure being constructed and arranged to fit over a human chest;*

*(b) a plurality of pockets for storing fishing accessories attached to said shell structure, wherein at least one of said plurality of pockets is a retractor pocket provided with an interior region and an opening facing downwardly when the article of clothing is worn by a wearer in an upright standing position; and*

*(c) a retractor secured within the interior region of said retractor pocket.*

*12. An article of clothing according to claim 11, wherein said retractor includes a spring for biasing said retractor to a retracted position.*

*13. An article of clothing according to claim 2, wherein the spring comprises a polyurethane material.*

*14. A article of clothing according to claim 11, comprising at least two retractor pockets for storing fishing accessories attached to said shell structure, wherein the at least two retractor pockets are provided with an interior region and an opening facing downwardly when the article of clothing is worn by a wearer in an upright standing position.*

*15. An article of clothing according to claim 14, wherein the at least two retractor pockets are located on a front portion of the article of clothing.*

*16. An article of clothing according to claim 15, wherein the at least two retractor pockets are provided adjacent the neckline.*

*17. An article of clothing according to claim 11, wherein said article of clothing is a shirt.*

*18. An article of clothing according to claim 11, wherein said article of clothing is a coat.*

*19. An article of clothing for holding fishing accessories, said article of clothing comprising:*

*(a) a shell structure;*

*(b) a plurality of pockets for storing fishing accessories attached to said shell structure, wherein at least one of said plurality of pockets is a retractor pocket provided with an interior region and an opening facing downwardly when the article of clothing is worn by a wearer in an upright standing position; and*

*(c) a retractor secured within the interior region of said retractor pocket.*

*20. An article of clothing according to claim 19, wherein said retractor comprises a spring and a clip, the spring for biasing said retractor to a retracted position.*

*21. An article of clothing according to claim 20, wherein the spring comprises a polyurethane material.*

*22. An article of clothing according to claim 19, comprising at least two retractor pockets for storing fishing accessories attached to said shell structure, wherein the at least two retractor pockets are provided with an interior region and an opening facing downwardly when the article of clothing is worn by a wearer in an upright standing position.*

*23. An article of clothing according to claim 19, wherein said article of clothing is a daypack.*

*24. An article of clothing according to claim 19, wherein said article of clothing is a pair of pants.*

*25. An article of clothing for holding fishing accessories, said article of clothing comprising:*

(*a*) *a shell structure having a neckline, a left arm hole, a right arm hole, and a bottom edge, the shell structure being constructed and arranged to fit over a human chest;*

(*b*) *a plurality of pockets for storing fishing accessories attached to said shell structure;*

(*c*) *a sheath attached to said shell structure forming an interior region having at least one opening; and*

(*d*) *a retractor secured within the interior region and extending downwardly through the at least one opening when the article of clothing is worn by a wearer in an upright position.*

*26. An article of clothing according to claim 25, wherein the interior region opens downwardly when the article of clothing is worn by a person in an upright position.*

*27. An article of clothing according to claim 25, wherein said sheath is sewn to the shell structure.*

*28. An article of clothing according to claim 25, wherein said retractor comprises a spring for biasing said retractor to a retracted position, the spring being sewn to the shell structure within the interior region.*

*29. An article of clothing according to claim 28, wherein the spring comprises a polyurethane material.*

*30. An article of clothing according to claim 25, wherein said article of clothing is a shirt.*

*31. An article of clothing according to claim 25, wherein said article of clothing is a coat.*

* * * * *